RANGE-LIMITED CONVERSION BETWEEN DIGITAL AND ANALOG SIGNALS

Filed July 29, 1966

INVENTOR.
Lawrence R. Smith

BY
Mueller, Aichele & Rauner
ATTY'S.

3,496,562

RANGE-LIMITED CONVERSION BETWEEN DIGITAL AND ANALOG SIGNALS

Lawrence R. Smith, Phoenix, Ariz., assignor to Motorola, Inc., Franklin Park, Ill., a corporation of Illinois
Filed July 29, 1966, Ser. No. 568,939
Int. Cl. H04l 3/00; H03k 13/00
U.S. Cl. 340—347 5 Claims

ABSTRACT OF THE DISCLOSURE

A system for insuring a continuous output in a digital to analog conversion operation is disclosed. The system utilizes upper and lower reference signals to range limit the digital information contained in the storage register or accumulator supplying the digital signals to the converter.

This invention relates to devices for making conversions between digital and analog signals and particularly to those converters usable in open loop-type control systems.

In digital computer controlled processes there are several requirements for a device which interfaces between the digital computers and the controlled process which are independent of a particular application. These requirements include:

(1) The interfacing system must accept information in a form readily provided by digital computer;

(2) Such digital computer provided information signals should be capable of being inexpensively transmitted over distances up to several miles with high reliability and high noise immunity;

(3) The interfacing system must provide a continuous and accurate output representative of the computer output signals;

(4) The interface system provided output analog signals must be maintained indefinitely in the event of computer or communication system failure.

The above listed requirements indicate that such an interfacing system, such as in a digital-to-analog converter system, must accept information in sampled form, convert such received information into a continuous analog output signal and maintain such analog output signal until the next computer sample is received.

Previously motor driven slide wires or potentiometers have been used to convert digital computer output signals into analog current or voltage signals. Because of the limited reliability of the mechanical portions of the motor, brushes and slide wire, it is desired to provide a solid-state converter system which performs all of the functions of a motor driven potentiometer and yet provides a greatly improved reliability. An important requirement is that the output analog signal not be subjected to large transients as could upset operation of a controlled process.

Accordingly, it is an object of this invention to provide an improved solid state device for making conversions between digital and analog signals.

It is another object of this invention to provide a simplified solid state converter system for converting between digital and analog signals.

It is a further object of this invention to provide an open loop-type of digital-to-analog converter and which includes output signal range limiting means for preventing any discontinuities occurring in the output analog signal.

According to this invention a digital register supplies digital signals to a digital-to-analog converter. The converter output analog signal is then fed back to the digital register through a set of analog comparators and gates.

The output analog signals are compared with upper and lower reference limit signals to determine whether or not the analog signal amplitude is between the reference signal amplitudes. If the received signal from a digital computer indicates a change in the digital register causing the output analog signal amplitude to exceed said limits, a control circuit is energized for inhibiting a further change in the content of the digital register, keeping the output signal amplitude within the defined range of operation.

When the digital register is a forward-backward binary counter, the register count can proceed additively to all ones and then immediately go to all zeros to provide a discontinuity in the analog output signal. Such discontinuity would upset a control process. In a similar manner when such a counter is driven subtractively it can be forced to count through all zeros with the next step providing all ones resulting in a second discontinuity being provided in the analog output signal. According to this invention, the output analog signal is fed back to the input of the forward-backward counter and compared with upper and lower reference limit signals for preventing a forward-backward counter from counting past all zeros or all ones conditions of such a counter.

An application of the subject matter of this invention is a computer "set point" as described herein. An "increase/decrease" device may consist of a counter, having two bistable flip flops, one indicating increase and the other a decrease, followed by an input-output switching matrix for connecting the output of the bistables to the converter. The counter and bistable functions can be performed by accumulator registers used for arithmetic operations within a computer and consequently no separate hardware is required for these functions.

The computer program then positions the input/output matrix to a specific process point being controlled. The input signal through the input matrix provides the computer with the current process value. The computer subtracts this value from a stored or pre-calculated desired set point to obtain the error signal. This error signal is operated on by a control algorithm also stored in the computer. The resultant of this operation is a signal representing a number equal to the desired change of the control element.

The desired change signal is inserted into an accumulator which counts at the clock rate of the computer. At the start of the count down, the increase or decrease flip flop is set to the "one" state. The signal from the selected flip flop is connected to a converter by the output matrix and causes the counter within the selected converter to start counting forward or backward. The count will continue until the computer accumulator reaches zero at which time the flip flop is returned to its zero state. The program then steps to its next position. The output of the converter units are of course connected to the control elements.

The digital to pulse duration conversion should be as rapid as possible in order for the computer to operate on hundreds of control points every second. Consequently it is desirable for the accumulator counter and forward/backward counter within the converter unit to operate at a high pulse rate (100,000 pps. or greater).

The fast count rate dictates the use of a time duration signal rather than letting the counter within the converter unit count forward or backward on pulses originating at the computer. This is true because of the desire to transmit the signals from computer to converter units through relatively complex switching circuitry, over distances up to several miles and in an environment that is extremely noisy (heavy motors and machinery).

The time duration signal (dual oscillator) technique allows the communication bandwidth between computer and converter units to be in the order of $\frac{1}{100}$ of the bandwidth that would be required to transmit the oscillator pulses directly. This decreased bandwidth reduces the power of induced noise by about 100:1 as well as provides for a considerably lower cost installation.

Referring now to the accompanying drawing.

An additive-subtractive digital accumulator, such as a forward-backward counter, forms a memory for holding a set of digital signals. Computer output signals are selectively applied to the accumulator for adding to or subtracting from the number represented by the stored digital signals. The accumulator provides output digital signals to a digital-to-analog converter which supplies an analog amplitude signal representative of the content of the accumulator. The analog output signal is provided to a utilization device and also compared with an upper reference limit signal and a lower reference limit signal. The results of such comparisons are provided to control circuits which limit the inputs to the accumulator such that the accumulator will never count past all ones to all zeros, or vice versa.

In one form of the invention the input signals from a digital computer are pulses, the duration of which indicates a predetermined change in the digital count. The time duration pulses are selectively passed by comparison circuits to energize a pulse generator which advances or subtracts from the count in the accumulator within the defined range of conversions.

In the following description, like numbers indicate like parts in the various diagrams.

Figure 1:
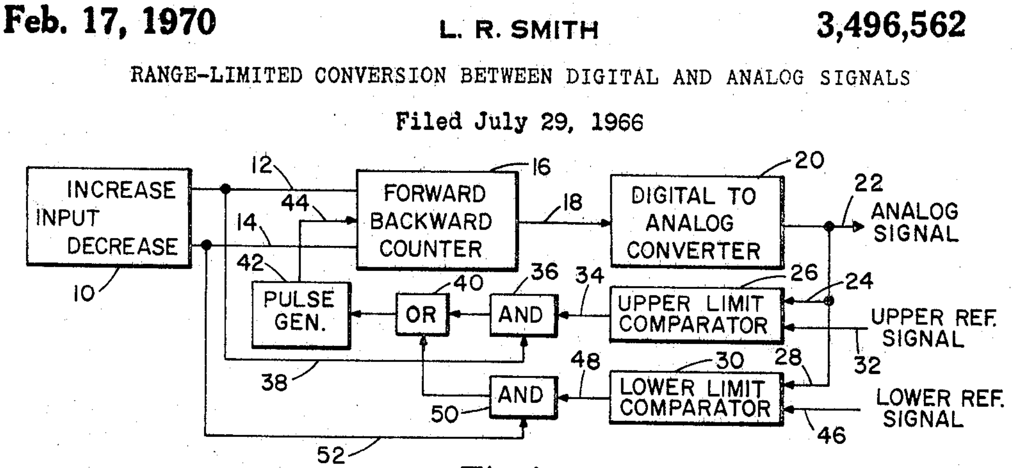
FIG. 1 is a block diagram of an embodiment of the subject invention.

Referring now more particularly to FIG. 1, input means 10 provides pulses over lines 12 and 14 to forward-backward counter 16 for indicating respectively that the digital number in the counter is to be increased or decreased. Counter 16 supplies digital signals over line 18 to digital-to-analog converter 20, which in turn supplies a corresponding analog signal over line 22 to a process to be controlled (not shown) or other utilization device (not shown). The output analog signal is also provided over line 24 to upper comparator 26 and over line 28 to lower comparator 30. Converter 20 may be of the known current summing type, no limitation thereto is intended.

The range of operation is determined by two reference signals. The upper limit of the range is provided by an upper reference limit signal as supplied over line 32 to comparator 26. When the signal on line 24 is of lower amplitude than the upper reference limit signal, comparator 26 provides an enabling signal over line 34 to open AND circuit 36. An "increase-count" signal from input means 10 is provided over line 38 and is passed through AND circuit 36, thence through OR circuit 40 to actuate pulse generator 42. Actuated generator 42 then supplies recurrent pulses over line 44 causing the forward-backward counter 16 to count. The direction of the count is determined by the signals on lines 12 and 14 as will become apparent.

The lower limit of the range is provided by a lower reference limit signal being supplied on line 46 and compared with the output analog signal on line 28 in comparator 30. When the line 28 output analog signal has an amplitude greater than the lower limit reference signal, comparator 30 provides a signal on line 48 to enable or open AND circuit 50. The "decrease count" pulse on line 14 as provided over line 52 to AND circuit 50 is then passed through OR circuit 40 to enable generator 42 as above described for the "increase count" operation. The recurrent pulses on line 44 actuate counter 16 to count subtractively from the number contained in the counter as enabled by the decrease count pulse on line 14 as will become apparent.

Therefore, the range of the numerical counts permitted in counter 16 and the variation range of the output analog signal on line 22 is determined by the two above-mentioned upper and lower reference limit signals. In practice, the reference limit signals are set several hundred counts respectively from the all ones condition of the counter and the all zeros condition of the counter. For example, if counter 16 has ten binary digit positions, its modulus is $2^{10}-1$. The lower reference limit signal on line 46 is set such that counter 16 will not count below 100. (Ten digit binary numbers 00001100100.) Therefore, the output analog signal on line 22 is at a minimum amplitude when counter 16 contains a count of 100. In a similar manner upper reference limit signal on line 32 limits counter 16 to a maximum count, for example number 900, (ten digit binary number 01110000100) which corresponds to the maximum output analog signal amplitude. When an "increase count" pulse is provided over line 12 which would cause counter 16 to count beyond 900; the output of comparator 26 closes AND circuit 36 preventing further additive counts. In a similar manner AND circuit 50 is closed by comparator 30 when the count reaches 100.

The pulses on lines 12 and 14 have a time duration equal to a predetermined number of pulses provided by generator 42 to thereby adjust the numerical content in counter 16 a predetermined amount.

By providing pulses from source 10, the duration of which indicates the number by which counter 16 is altered, an extremely low bandpass channel may be used for lines 12 and 14.

It should be noted that the analog comparison circuits described herein provide a simple and facile method of limiting the range of conversion and yet permits usage of almost all of the counter 16 modulus.

Figure 2:
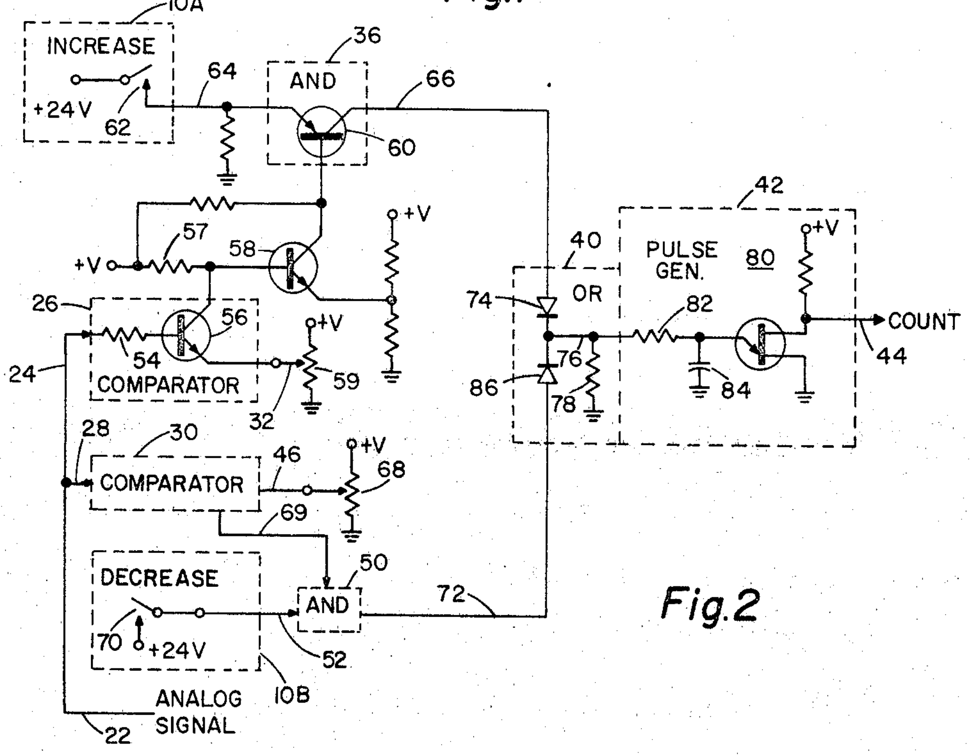
FIG. 2 is a combined block and schematic diagram illustrating an exemplary comparator, gate and count circuits for the FIG. 1 embodiment.

Referring now more particularly to FIG. 2, the comparison circuits 26 and 30 and the AND circuits 36 and 50 together with the pulse generator 42 are illustrated in detail. Comparator 26 receives converter 20 output analog signals over line 24 through base resistor 54 to base drive transistor 56. The emitter electrode of transistor 56 is connected over line 32 to potentiometer 59. Potentiometer 59 is connected between +V potential volts and ground reference potential and the setting of the potentiometer provides the upper reference limit signal voltage to the emitter of transistor 56. As long as the analog output signal amplitude on line 24 is less positive than the voltage on line 32, transistor 56 remains non-conductive. Thereby, +V volts is provided through resistor 57 to the base of inverting amplifier transistor 58 making it conductive. This action opens AND circuit 36 to pass signals from "increase count" signal input circuit 10A.

The increase count signal from input circuit 10A is supplied through a set of normally open contacts 62. When closed contacts connect positive 24 volts to line 64 (corresponds to line 38 in FIG. 1) and thence the emitter electrode of transistor 60. Such positive voltage is provided over line 64 and is selectively passed through transistor 60 to line 66 thence OR circuit 40 for actuating generator 42, as later more fully described.

The lower limit control AND circuit 50 is constructed identically to AND circuit 36. Comparator 30 is also constructed identically to comparator 26. The lower reference limit signal is provided over line 46 from a potentiometer 68. When the output analog signal on line 28 is positive with respect to the voltage on line 46, it is desired to permit counter 16 (FIG. 1) to subtractively count. Referring again to transistor 56 (comparator 26), it will be noted that transistor 56 is conductive (low impedance path is provided) whenever the analog output signal is greater than the reference potential. Accordingly, a low impedance path is provided by the comparator 30 over line 69 for opening AND circuit 50 as aforedescribed for AND circuit 36. Input circuit 10B includes a set of normally open contacts 70 which when closed provide +24 volts to AND circuit 50. When comparator 30 provides a low impedance circuit AND input 10B provides a positive signal over line 52, AND circuit 50 supplies a positive signal over line 72 to OR circuit 40 for actuating pulse generator 42.

Counter 16 is actuated to additively count pulses by a positive signal over line 66, thence diode 74 for making line 76 positive. The positive signal appears across the output resistor 78 of the OR circuit 40 and is applied to the input of unijunction transistor oscillator 80. Oscillator 80 includes timing resistor 82 and capacitor 84 and operates in a known manner to provide pulses over line 44, such as at a one kilocycle rate. Such pulses are provided to counter 16 as long as input 10A calls for an increase in the count AND the analog signal on line 22 has not exceeded the upper limit reference signal.

In the same manner counter 16 subtracts from the count whenever a positive signal over line 72 forward biases diode 86 of OR circuit 40 to actuate pulse generator 42 to provide recurrent pulses on line 44. The pulses will be provided as long as input 10B calls for a decrease in the count AND the lower limit reference signal has a more positive magnitude than the analog output signal.

Figure 3:
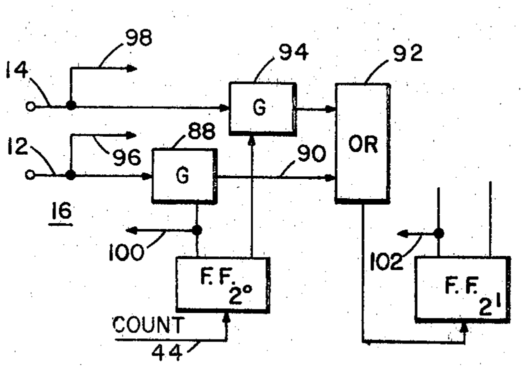
FIG. 3 illustrates the lowest ordered digital positions of a typical forward-backward counter.

Forward-backward counter 16 may take any well known configuration. A typical configuration of the first two states of such a forward-backward counter is illustrated in FIG. 3 with the pulses provided by generator 42 being supplied over line 44 to the toggle input of the least significant digit position of the counter $2^0$. When the counter is operating in the additive mode, a positive signal over line 12 opens gate circuit 88 for providing a pulse over line 90 each time flop flop $2^0$ changes from the "1" to the "0" indicating states. OR circuit 92 passes the pulse to the toggle input of flip flop $2^1$. The other digit positions operate in a similar manner to additively count pulses.

Subtraction in counter 16 is caused by a positive signal over line 14 which opens gate 94 to pass pulses whenever flip flop $2^0$ changes from "0" to the "1" indicating states. OR circuit 92 passes such a pulse to toggle flip flop $2^1$ for providing a subtractive operation, as is well known. Lines 96 and 98 indicate connections of lines 12 and 14 respectively to other gate circuits (not shown) associated with other digit positions (not shown) of counter 16.

The flip flops in counter 16 form a memory register for holding the digital signal being converted into analog form. It also acts as an accumulator in that it accumulates the number of pulses supplied over line 44. The counter 16 also drives digital-to-analog converter 20 from the "1" output circuits of the respective flip flops. For example, the $2^0$ flip flop provides its "1" indicating signal over line 100, while $2^1$ flip flop provides its "1" indicating signal over line 102. Lines 100 and 102 correspond to line 18 in FIG. 1.

What is claimed is:

1. A system for providing range limited conversions between digital and analog signals which comprises:

(a) a digital register for receiving and storing digital information;

(b) a digital to analog converter for receiving the digital information stored in said register and converting said information into an analog output signal;

(c) analog signal comparison means coupled to the output of said converter for comparing the analog output signal from said converter with analog reference signals, said means providing output indications when said output analog signal is within a predetermined range;

(d) input means coupled to the register, said input means providing a pulse the duration of which is indicative of a desired change in the digital information stored in said register;

(e) a pulse generator for supplying pulses to said register in response to a signal applied to the input of said generator; and (f) gating means coupled between the input of said generator and the output of said comparison means, said gating means applying a signal to the input of said generator upon the concurrence of an output indication from said comparison means and a pulse from said input means whereby pulses are supplied to said digital register as long as the information contained therein is within said predetermined range.

2. The system of claim 1 wherein said comparison means provides two reference signals which define the predetermined range, said means continuously supplying an output indication to said gating means when the output analog signal amplitude is intermediate the amplitudes of said reference signals.

3. The system of claim 2 wherein said gating means includes a pair of AND circuits each of which receive a reference signal from said comparison means and a signal from said input means, said input means providing pulse signals indicating that the information in said register should be increased or decreased, and an OR circuit connected to the AND circuits and to the input of said pulse generator for selectively actuating the same.

4. The system of claim 3 wherein the digital register is a forward-backward binary counter.

5. The system of claim 4 wherein the analog signal comparison means includes a pair of semiconductor devices each having base and emitter portions, one of said portions of each device respectively receiving one of said reference signals and another portion of each device receiving said output analog signal and each device being jointly responsive to the analog signals on their respective portions to provide either a high impedance or a low impedance, the AND circuits of said gating means being connected to the respective devices and respectively responsive to one of said impedances to selectively pass signals from the input means and to block the respective input signal when another impedance is provided, said AND circuits each comprising a single semiconductor device jointly responsive to the input means signal and said respective impedances to selectively supply a pulse generator actuating signal to said OR circuit for selectively actuating the generator to provide recurrent pulses to said digital register, and a pulse generator consisting of a unijunction transistor oscillator.

References Cited

UNITED STATES PATENTS

| | | | |
|---|---|---|---|
| 2,836,356 | 5/1958 | Forrest et al. | 340—347 X |
| 2,928,033 | 3/1960 | Abbott. | |
| 3,145,292 | 8/1964 | Schwaninger | 235—92 |
| 3,251,981 | 5/1966 | Gaudette et al. | 235—92 |
| 3,381,277 | 4/1968 | Stansby | 340—324.1 |

MAYNARD R. WILBUR, Primary Examiner

MICHAEL K. WOLENSKY, Assistant Examiner

U.S. Cl. X.R.

235—154; 307—235